United States Patent
Ma et al.

(10) Patent No.: US 11,379,647 B2
(45) Date of Patent: Jul. 5, 2022

(54) MULTILAYER OPTICAL PROXIMITY CORRECTION (OPC) MODEL FOR OPC CORRECTION

(71) Applicant: Intel Corporation, Santa Clara, CA (US)

(72) Inventors: Hyungjin Ma, Hillsboro, OR (US); Gregory Toepperwein, Portland, OR (US); Nabil Laachi, Portland, OR (US); Chihhui Wu, Hillsboro, OR (US); Vasudev Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 16/771,172

(22) PCT Filed: Mar. 30, 2018

(86) PCT No.: PCT/US2018/025594
§ 371 (c)(1),
(2) Date: Jun. 9, 2020

(87) PCT Pub. No.: WO2019/190566
PCT Pub. Date: Oct. 3, 2019

(65) Prior Publication Data
US 2021/0072635 A1    Mar. 11, 2021

(51) Int. Cl.
*G06F 30/30* (2020.01)
*G06F 30/27* (2020.01)
(Continued)

(52) U.S. Cl.
CPC .............. *G06F 30/398* (2020.01); *G03F 1/36* (2013.01); *G03F 7/705* (2013.01);
(Continued)

(58) Field of Classification Search
None
See application file for complete search history.

(56) References Cited

U.S. PATENT DOCUMENTS 7,732,108 B2 * 6/2010 Park .......................... G03F 1/36
430/30
9,638,994 B2 * 5/2017 Cheng ...................... G03F 1/36
(Continued)

FOREIGN PATENT DOCUMENTS

WO    WO-2017-171891      10/2017
WO    WO-2017171890 A1 *  10/2017
(Continued)

OTHER PUBLICATIONS

International Search Report and Written Opinion for International Patent Application No. PCT/US2018/025594 dated Dec. 27, 2018, 10 pgs.
(Continued)

*Primary Examiner* — Leigh M Garbowski
(74) *Attorney, Agent, or Firm* — Schwabe, Williamson & Wyatt P.C.

(57) ABSTRACT

A method for optical proximity correction (OPC) comprises creating a semi-physical model of a mask for a current layer in an IC design layout using physical parameters of a lithography process used to create the mask, the semi-physical model specifying contours of the plurality of features of the mask. It is determined from design information whether the current layer is deformed by the one or more reference layers that overlap the current layer near the contours. Responsive to determining that the current layer is deformed by the one or more reference layers, the semi-physical model and the design information of the one or more reference layers are input into a trained machine learning algorithm to generate a contour shift prediction for the current layer, the contour shift prediction estimating a
(Continued)

residual error of the semi-physical model. The contour shift prediction is then used for multilayer OPC correction of the current layer.

25 Claims, 10 Drawing Sheets

(51) Int. Cl.
G03F 7/20 (2006.01)
G03F 1/36 (2012.01)
G06F 30/398 (2020.01)
G06F 119/18 (2020.01)

(52) U.S. Cl.
CPC .......... *G03F 7/70441* (2013.01); *G06F 30/27* (2020.01); *G06F 2119/18* (2020.01)

(56) References Cited

U.S. PATENT DOCUMENTS

| | | | |
|---|---|---|---|
| 10,395,362 B2* | 8/2019 | Gupta | G06N 20/00 |
| 10,990,018 B2* | 4/2021 | Tel | G03F 9/7046 |
| 2007/0077504 A1 | 4/2007 | Park | |
| 2010/0171036 A1 | 7/2010 | Abdo | |
| 2014/0220786 A1 | 8/2014 | Lukanc et al. | |
| 2015/0286131 A1 | 10/2015 | Cheng et al. | |

FOREIGN PATENT DOCUMENTS

WO  WO-2018125219 A1 * 7/2018
WO  WO-2018125220 A1 * 7/2018

OTHER PUBLICATIONS

International Preliminary Report on Patentability for International Patent Application No. PCT/US2018/025594 dated Oct. 15, 2020, 7 pgs.

* cited by examiner

|         | Target Var. | Density 1_1 | ... | Density m_m |
|---------|-------------|-------------|-----|-------------|
| Vertex 1 | 3.5 | 0.36 | | 0.33 |
| Vertex 2 | 3.3 | 0.22 | | 0.24 |
| ... | ... | ... | | ... |
| Vertex n | 1.0 | 0.05 | | 0.07 |

FIG. 4C

MULTILAYER OPTICAL PROXIMITY CORRECTION (OPC) MODEL FOR OPC CORRECTION

CROSS-REFERENCE TO RELATED APPLICATION

This patent application is a U.S. National Phase Application under 35 U.S.C. § 371 of International Application No. PCT/US2018/025594, filed Mar. 30, 2018, entitled "MULTILAYER OPTICAL PROXIMITY CORRECTION (OPC) MODEL FOR OPC CORRECTION," which designates the United States of America, the entire disclosure of which is hereby incorporated by reference in its entirety and for all purposes.

TECHNICAL FIELD

Embodiments of the disclosure are in the field of semiconductor photolithography and, in particular, a multilayer optical proximity correction (OPC) model for OPC correction.

BACKGROUND

Demand for compact semiconductor devices has driven production of semiconductor devices with smaller and smaller features as time progresses. As a result, photomask design for producing these smaller features is no longer a trivial task. For example, in the past, when features were larger, features in photomask designed to produce the features in the semiconductor device had similar shape as the features in the semiconductor device. In contrast, features in masks for producing today's much smaller features in semiconductor devices may not be recognizable to a human observer as corresponding to the features in the semiconductor device.

Software tools are often used to aid in the design of photomasks for producing very small features in semiconductor devices. Sometimes photomask features designed with the aid of these software tools are at or near manufacturing tolerances for mask manufacturing (e.g., tolerances in dimensions). As a result, infidelities in manufactured masks sometimes occur, particularly in features at or near manufacturing tolerances. Infidelities in photomask masks can lead to infidelities in the features of semiconductor devices manufactured with the photomasks.

BRIEF DESCRIPTION OF THE DRAWINGS

FIG. 4C is an example target variable table used for machine learning model training.

DESCRIPTION OF THE EMBODIMENTS

Figure 1:
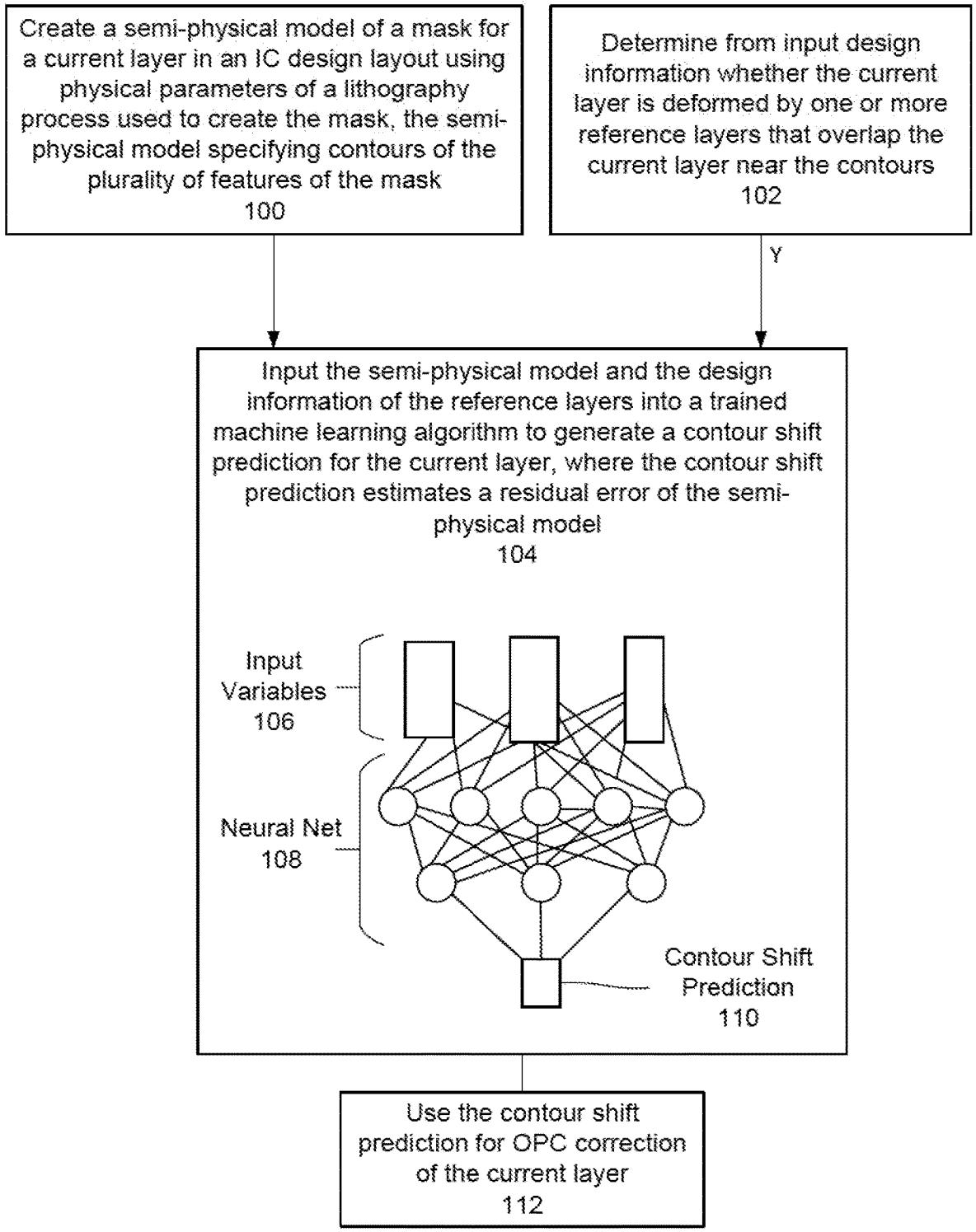
FIG. 1 is a diagram illustrating a process for optical proximity correction (OPC) utilizing a multilayer model.

A multilayer optical proximity correction (OPC) model for OPC correction is described. In the following description, numerous specific details are set forth, such as specific material and tooling regimes, in order to provide a thorough understanding of embodiments of the present disclosure. It will be apparent to one skilled in the art that embodiments of the present disclosure may be practiced without these specific details. Furthermore, it is to be understood that the various embodiments shown in the Figures are illustrative representations and are not necessarily drawn to scale. In some cases, various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

Various operations will be described as multiple discrete operations, in turn, in a manner that is helpful in understanding the disclosure. The order in which the operations are presented in the description, however, should not be construed to imply that these operations are necessarily order dependent. In particular, these operations need not be performed in the order of presentation. Rather, in some embodiments, the order may be modified.

Disclosed herein is a multilayer optical proximity correction (OPC) tool and model for OPC. The disclosed embodiments introduce a multilayer software tool that incorporates patterning effects from one or more neighboring reference layers of an IC design layout into full OPC correction of a current layer. The disclosed embodiments extend the machine learning methodology of previous tools by adding layout information from one or more neighboring reference layers into a correction model. Using this information, it is possible to capture patterning effects of neighboring reference layers that previous OPC correction techniques do not account for without time-consuming, rule-based adjustments. Thus, the disclosed embodiments allows timely response to multilayer phenomenon, while improving edge placement error (EPE).

It will be appreciated by those of ordinary skill in the art that one or more photomasks, also referred to as a "mask" or a "reticle", may be used at various different stages of manufacturing of a semiconductor device. The mask design principles disclosed herein may be applied to the design of any one or more of these masks used at any of the various different stages. The mask process development may begin with a design specification that represents an integrated circuit (IC) design. In one embodiment, the design specification may comprise computerized data files representing features of a target wafer pattern as millions or trillions of polygons on various layers. A typical semiconductor device may comprise many different layers, e.g., 50 layers, for example, and may require a similar number of lithographic process steps in order to manufacture the semiconductor device. Accordingly, each layer may have a corresponding photomask with different features. The data files representing the various layers are input to mask-writing equipment to convert data layers into a plurality of physical masks, e.g., a test mask, OPC test masks and/or production masks.

A photomask defines a pattern corresponding to features at one layer in an IC design. As light passes through the mask, it is diffracted by edges of the mask. This causes the projected image to exhibit some rounding and other optical distortion. These projected images appear with irregularities such as line widths that are narrower or wider than designed. Other distortions such as rounded corners are driven by the resolution of the optical imaging tool.

Optical proximity correction (OPC) is a photolithography enhancement technique commonly used to compensate for image errors due to diffraction or process effects. Typically, OPC is performed on a digital representation of a desired IC pattern. First, the digital IC pattern is evaluated with a software tool to identify regions where optical distortion will result, and a digital representation of the photomask design is modified to create an optically corrected or OPC mask. OPC corrects these errors by moving edges or adding extra polygons to the pattern written on the photomask. The modification is performed by software capable of for performing OPC. This may be driven by pre-computed look-up tables based on width and spacing between features (known as rule-based OPC) or by using compact models to dynamically simulate the final pattern and thereby drive the movement of edges, typically broken into sections, to find the best solution, (this is known as model-based OPC).

In the drive for smaller feature sizes, complex layouts are increasingly being split across multiple photomasks. This allows the patterning of more intricate combinations of features as well as providing a means to circumvent the physical limitation of resolution limits. One drawback of splitting layouts across multiple photomasks is the device produced is subject to the edge placement error (EPE) and affects not only of more patterning layers, but the interactions between those patterning layers. This adversely impacts device yield and performance.

Traditional OPC using semi-physical models describes the patterning of resist. Current techniques extend these models through postSED (Spin Exposure Develop) process steps such as etch. However, both cases are limited to evaluating the results of patterning from a single photomask. For example, previously existing mask-writing equipment enhance OPC Model prediction by compensating model errors from a semi-physical model. The compensation is derived from machine-learning techniques applied to optical information from the current layer being corrected. By its nature, that optical information is only capable of providing a geometric description of the layout and information about the health of the resist being used to pattern the layout. Multi-layer patterning effects are wholly unaccounted for during OPC correction. The current methodology to account for the effect of neighboring layer information relies upon a rule-based, iterative approach that provides sizing fixes to specific issues as they are encountered and characterized. This iterative process requires multiple development cycles to achieve results. In doing do, significant time and material resources are consumed in successive rounds of process evaluation to achieve an acceptable model fit.

According to the disclosed embodiments, systems, methods, and apparatuses are described for a multilayer OPC model for OPC correction via machine learning that incorporates available neighbor information into the full OPC model correction to reduce OPC model errors. The multi-layer OPC model allows timely response to multi-layer phenomena while improving overall edge placement error (EPE). This new method extends machine learning methodology by adding layout information from one or more neighboring or overlapping layers into the model. Using this information, it is possible to capture the effects of neighboring layers that previous OPC correction could not account for without time-consuming, rule-based adjustments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. In one embodiment, the machine-executable instructions may be referred to herein as a multilayer model predictor. Alternatively, the operations may be performed by a combination of hardware and software.

FIG. 1 is a diagram illustrating a process for optical proximity correction (OPC) utilizing a multilayer model. As used herein, "current layer" will refer to the layer receiving OPC correction, and "reference layer(s)" will refer to the layer or layers whose design information aids the OPC correction of the current layer.

In accordance with one embodiment the process may begin by creating a semi-physical model of a mask for a current layer in an IC design layout using physical parameters of a lithography process used to create the mask, the semi-physical model specifying contours of the plurality of features of the mask (block 100).

Figure 2A:
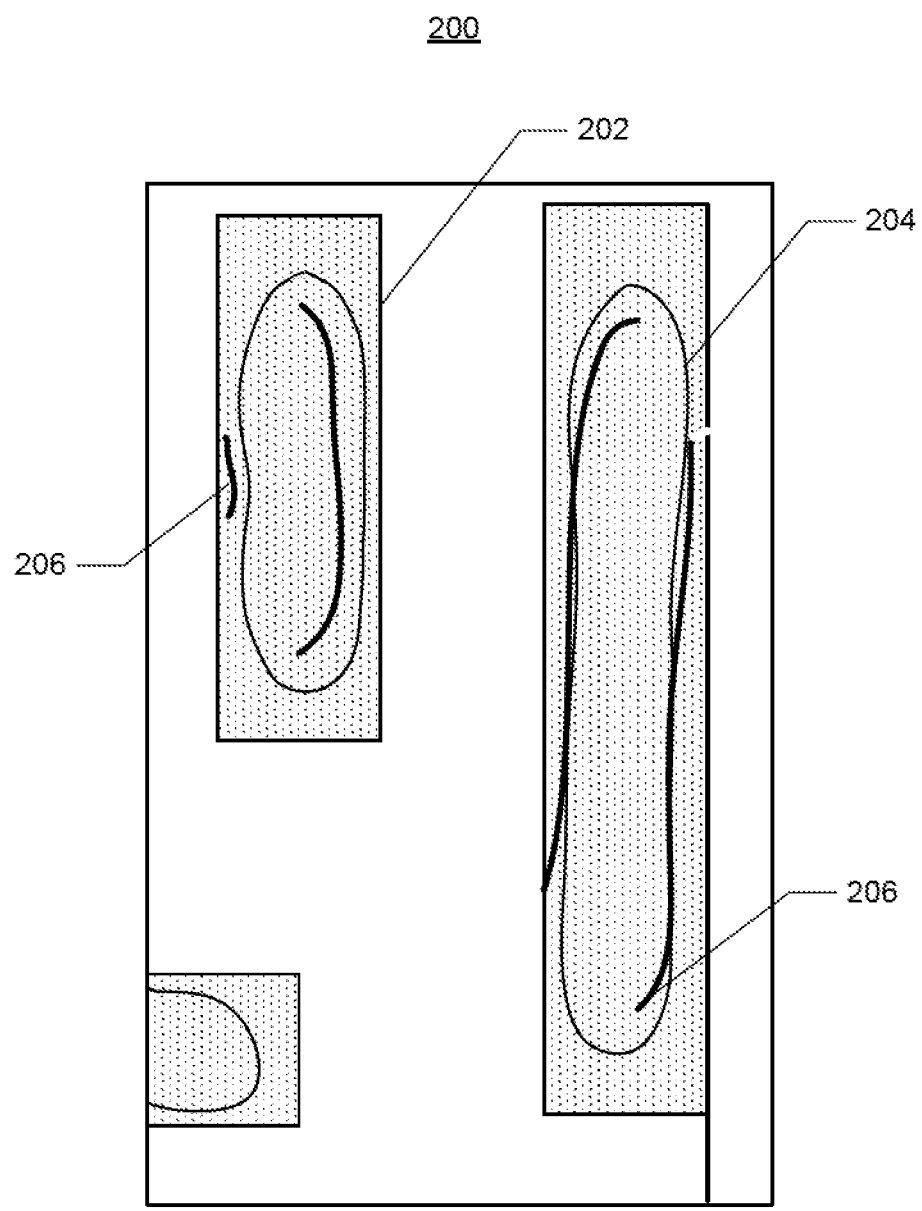
FIG. 2A is a diagram illustrating sample contours of the semi-physical model.

As an example, FIG. 2A is a diagram illustrating sample contours of the semi-physical model. For this example, assume that the current layer is a backbone grating layer (the current layer) 200 that has an overlapping a reference layer (not shown) that comprises a cut layer. The grating layer is subject to topological impact from the cut layer. Features 202 of the grating layer 200 are represented by rectangles and are received as part of the layout information. Calculated semi-physical model contours 204 are a single layer prediction of how the feature will print during the lithography process that does not include multi-mask effects. However, during subsequent processing, the combined backbone/cut system is subject to physical deformations acting upon material placed by disjoint lithographic steps to fabricate the grating layer 200 and the cut layer.

SEM (scanning electron microscope) contours 206 depicted by the dark lines represent fabrication data as measured from an SEM image. The SEM contours show that shifting and rotation effects during the disjoint lithographic steps are not accounted for by the semi-physical model 200 based on the available information from the current grating layer, which results in a delta or difference between the semi-physical model contours 204 and the SEM contours 206. In other words, the OPC for the backbone grating layer 200 has no information about where an overlapping cut layer will be placed so there is no accounting for such physical deformation. Consequently, the semi-physical model of a single layer results in residual OPC model errors.

According to the present embodiments, the residual OPC model errors are reduced using a multilayer OPC model that incorporates additional geometric information about layouts and polygons of neighboring reference layers.

Referring again to FIG. 1, it is first determined from input design information whether the current layer is deformed by one or more reference layers that overlap the current layer near the contours (block 102). In one embodiment, deformation may be determined where geometries from reference layers are within a predefined ambit from the contours of the current layer, where the ambit is estimated from test structures on wafer.

Figure 2B:
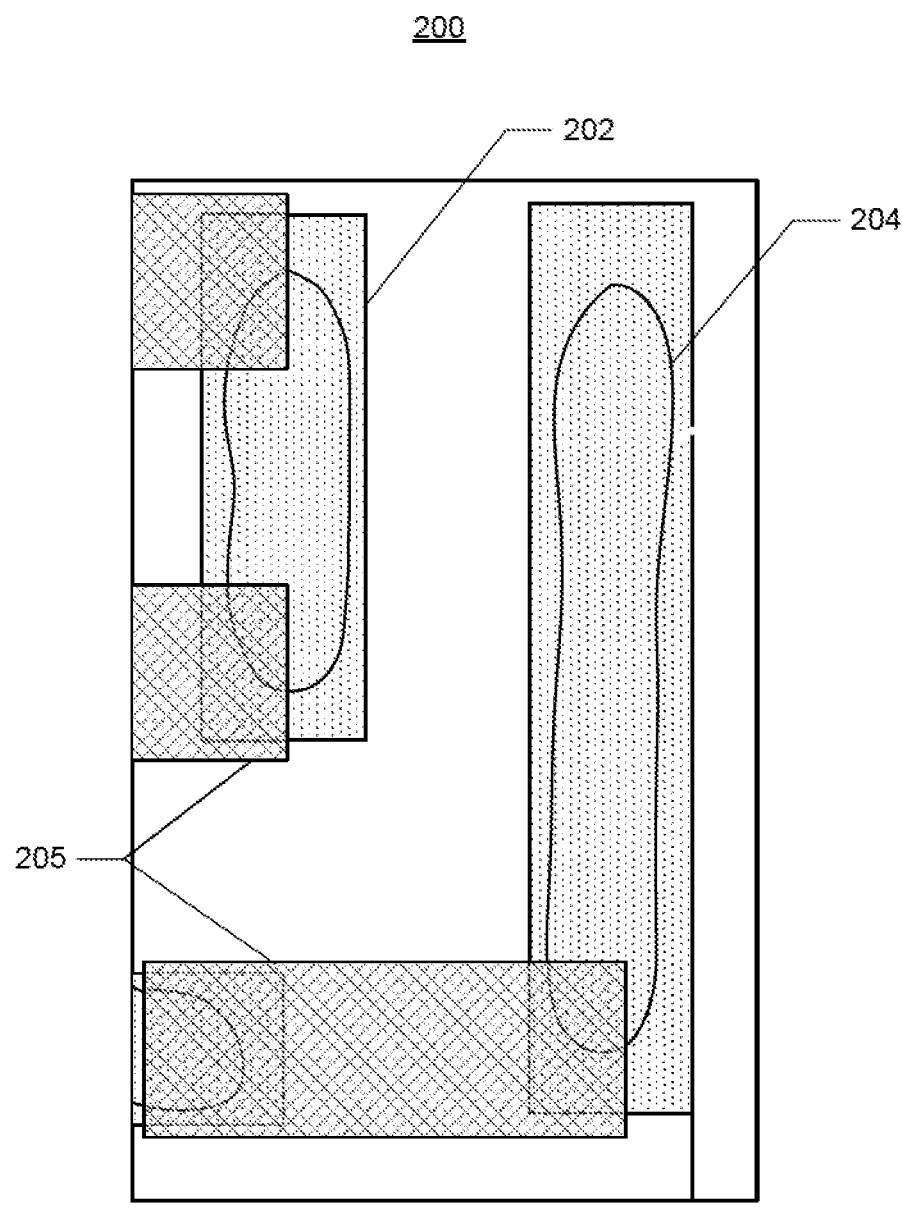
FIG. 2B is a diagram illustrating an example of features of a backbone grating layer after incorporation of geometrical data about a neighboring a cut/reference layer.

FIG. 2B is a diagram illustrating the features 202 of the backbone grating layer and incorporation of geometrical data about a neighboring cut/reference layer. As shown the neighboring cut reference layer has features 205 that overlap features 202 of the current layer 200.

In one embodiment, the design information provided to multilayer OPC model is a map of the polygons comprising the features 205 of the reference layer(s). The polygons are smoothed to reduce an incidence of artifacts associated with sudden transitions between regions in the current layer that are, and are not, overlapped the reference layer(s). Design information is used instead of optical information to prevent the need for co-optimization of models. In this way, OPC correction of the reference layer is not important to OPC correction of the current layer.

Referring again to FIG. 1, responsive to determining that the current layer is deformed by one or more reference layers, the semi-physical model and the design information of the reference layers are input into a trained machine learning algorithm to generate a contour shift prediction for the current layer, the contour shift prediction estimating a residual error of the semi-physical model (block 104). According to one embodiment, any type of trained machine learning algorithm may be used. However, in some embodiments, the machine learning algorithm is implemented as an artificial neural network 108, as shown. The artificial neural network 108 uses input variables 106 in the form of the semi-physical model and the design information of the reference layers to predict a deterministic model error, such as the contour shift prediction 110, or process driven changes in critical dimension.

After the trained machine learning algorithm generates the contour shift prediction 110, the contour shift prediction 110 is then used for multilayer OPC correction of the current layer (block 112). Thus, according to the present embodiments, if a current layer A is deformed by the presence of an overlapping reference layer B, the multilayer OPC model will be able to include information about layer B into the layer A contour shift prediction.

In particular, the contour shift prediction 110 generated by the trained neural network 108 is applied to the semi-physical model to generate a final multilayer model or a final contour for the current layer. The final multilayer model is then used by a correction engine for the mask design to apply the appropriate correction and generate a corrected or new physical mask for the current layer. Stated differently, the final model is re-applied via OPC correction to modify the physical mask such that features and structures are positioned in the correct location so that when a next silicon wafer is fabricated through the manufacturing process, all the structures and features will be in the correct location and the resulting silicon die will be functional and operate correctly according to design specifications.

Figure 2C:
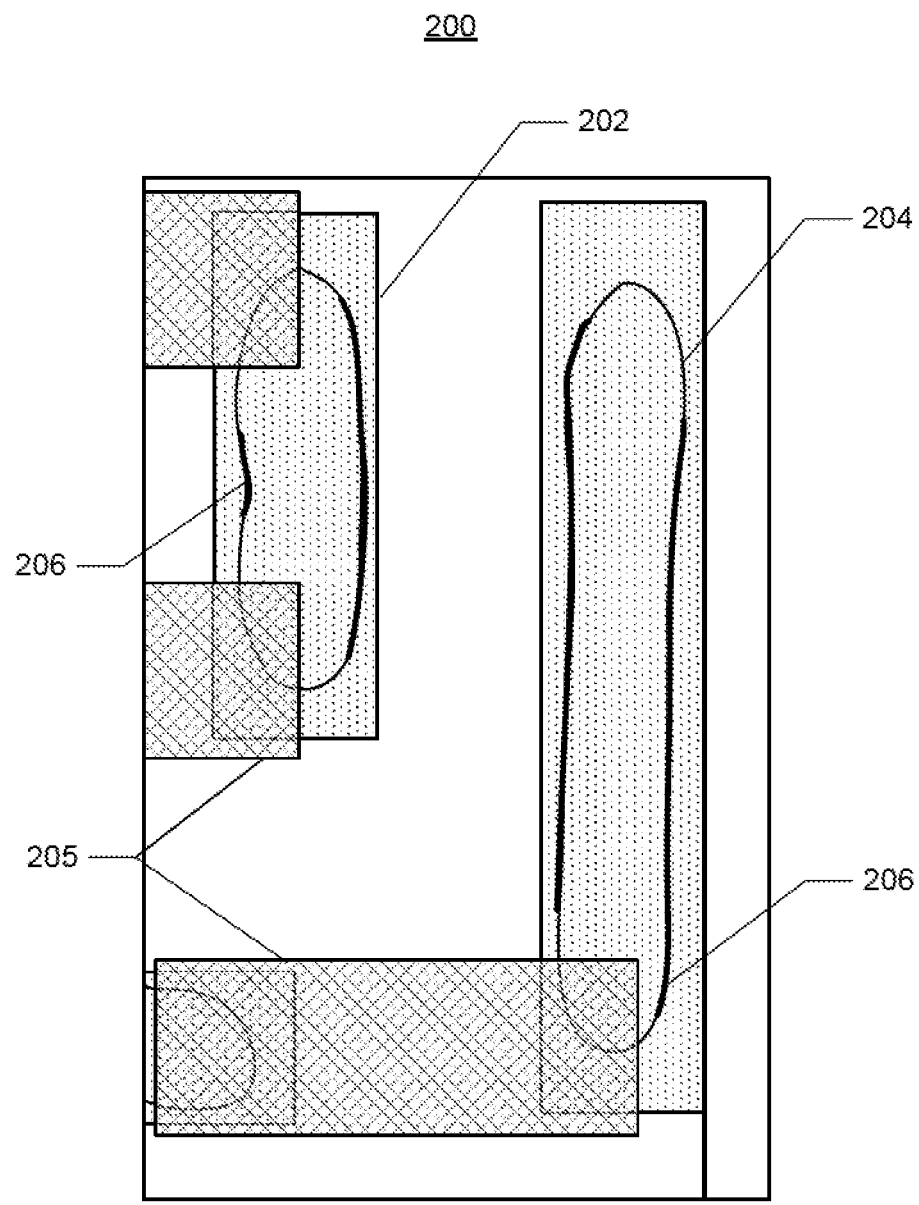
FIG. 2C is a diagram graphically illustrating how the multilayer OPC model improves upon the conventional single layer model in the example the backbone gratings and cut layers.

FIG. 2C is a diagram graphically illustrating how the multilayer OPC model improves upon the conventional single layer model in the example of the backbone gratings and cut layers of FIG. 1. By incorporating information about where the features 205 of reference layer are placed relative to the features 202 of the current grating layer 200, the OPC produces contour shift predictions that result in final contours 206 that more accurately match the SEM contours 204 for the current layer, and thus minimizing edge placement error.

By extending single layer OPC into the domain of multilayer systems, the disclosed multilayer OPC model directly produces an accurate description of underlying phenomena in a single OPC step. In addition, by moving correction from rule-based solutions into the multilayer OPC model, the multilayer OPC model extends the model into a continuous space capable of describing a wider range of potential corrections (e.g. corner rounding). The present embodiments improve upon the current best known solutions by reducing development time and providing a more accurate model.

The multilayer OPC model methodology uses optical image information near every feature from one or more reference layers to train the artificial neural network 108 to characterize the difference between a measured contour and a prediction of the residual errors in a semi-physical model.

The artificial neural network 108 uses input variables 106 in the form of the semi-physical model and the design information of the reference layers to predict a deterministic model error, such as the contour shift prediction 110, or process driven changes in critical dimension.

Any specific layout will have a deterministic OPC model error. Neural networks, such as artificial neural network 108, are able to approximate any arbitrary formula. Therefore, in accordance with described embodiments, the artificial neural network 108 is trained to describe the relationship between the IC design layout and the respective OPC model error, using (a) image parameters and (b) layout information from one or more of the overlapping reference layers to enable the artificial neural network 108 to learn about the IC design layout. The image parameters are defined via optical images that capture information about the layout which is then used to train the artificial neural network 108 to describe the deterministic relationship between the IC design layout and conventional single layer OPC model error. A sufficient quantity of image input parameters are provided so as to enable such learning. In some embodiments, the image input parameters for training include (a) simulated optical images from single layer OPC models obtained from a convolution of the layout and an optical transfer function and (b) scanning electron microscope (SEM) image data of the plurality of features embodied on the physical wafer fabricated using actual masks.

According to certain embodiments, density parameters of the features of neighboring reference layers in the IC design layout are input as the layout information from the reference layers includes to directly train the neural network 108 to predict the amount of single layer model error associated with the geometry. Once trained, the artificial neural network 108 provides a more accurate multilayer model which can then be implemented by shifting the initial OPC model contours 204 by an amount predicted by artificial neural network 108.

Figure 3:
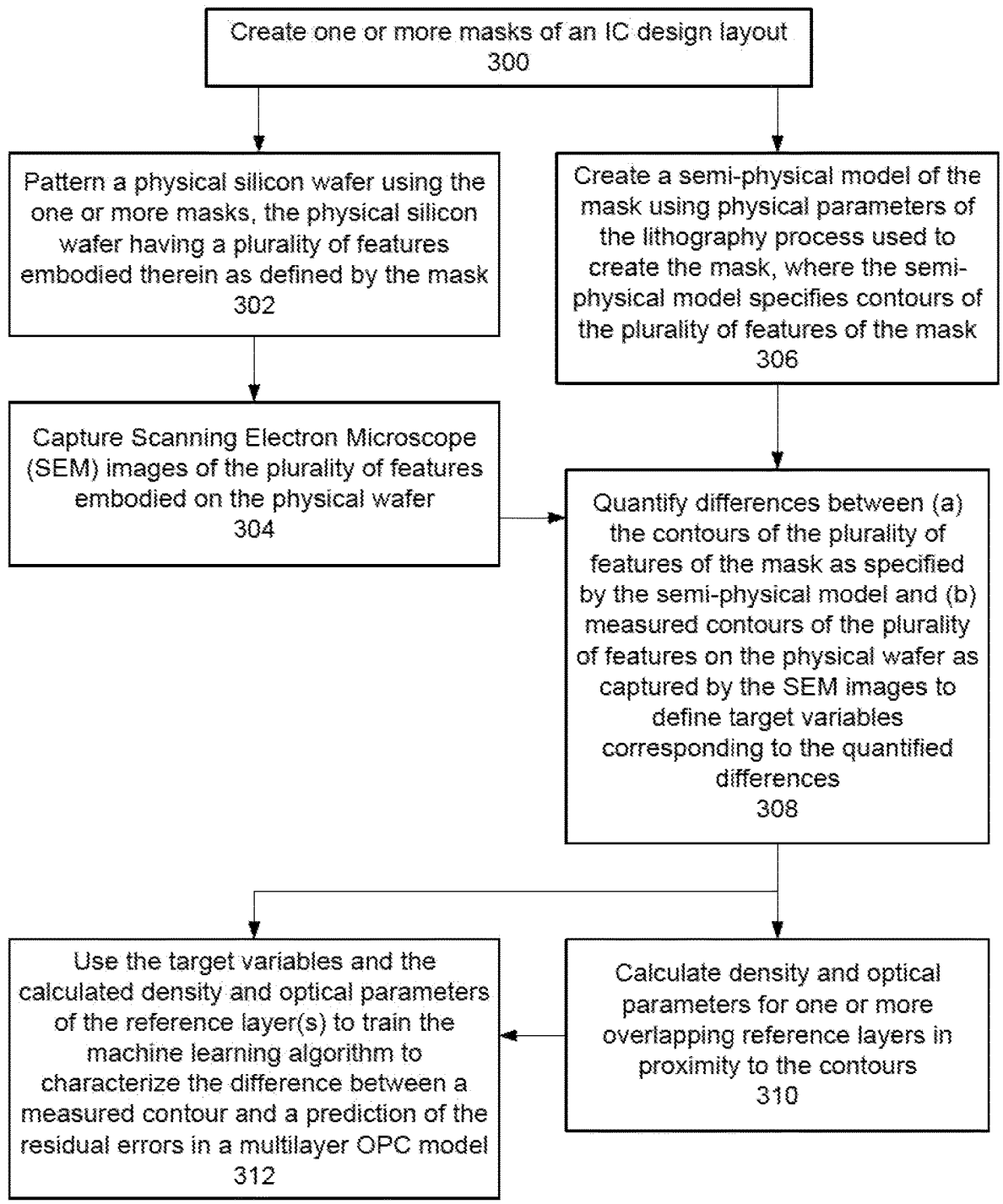
FIG. 3 is a diagram illustrating a process for training a machine learning algorithm to utilize a multilayer OPC model for contour prediction.

FIG. 3 is a diagram illustrating a process for training a machine learning algorithm to utilize a multilayer OPC model for contour prediction. In accordance with one embodiment, the process may begin by creating one or more masks of an IC design layout (block 300).

A physical silicon wafer is patterned using the one or more masks, the physical silicon wafer having a plurality of features embodied therein as defined by the mask (block 302).

SEM images are captured of the plurality of features embodied on the physical wafer (block 304). The SEM image data is collected for the patterns to detect the SEM contours 206 representing fab data for actual physical samples of fabricated physical silicon wafers generated using the initial OPC base model.

A semi-physical model of the mask is created using physical parameters of the lithography process used to create the mask, wherein the semi-physical model specifies contours of the plurality of features of the mask (block 306).

Figure 4A:
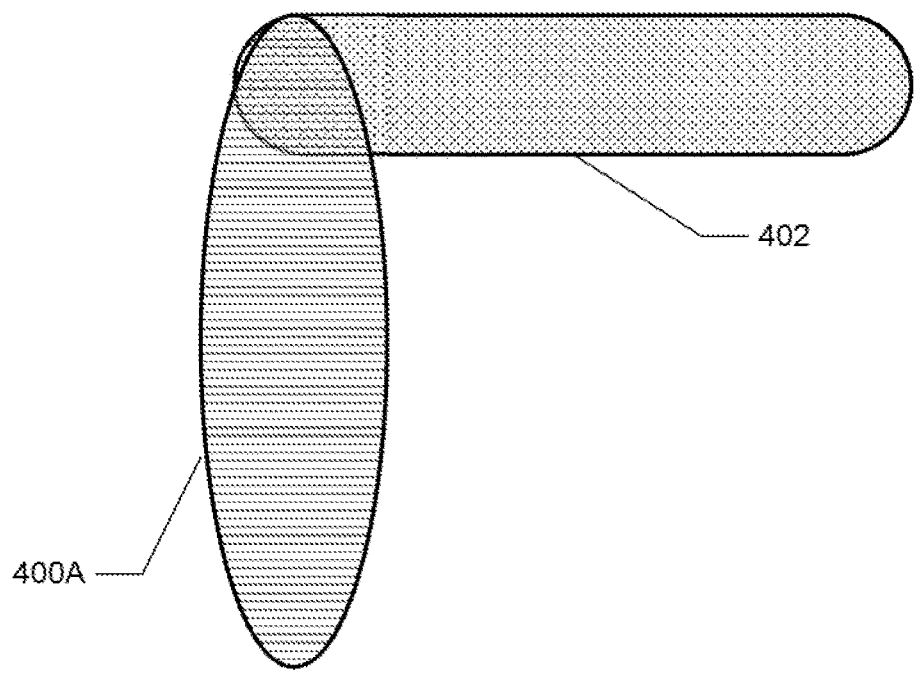
FIGS. 4A and 4B are diagrams of a hypothetical overlay of contours from the current layer and a reference layer.

FIG. 4A is a diagram of a hypothetical overlay of contours from the current layer and a reference layer. The semi-physical model of the mask for the current layer provides a single layer initial OPC contour 400A, which is a result of software algorithms that provide a prediction of the physical space without considering multi-layer interaction of one or more overlapping reference layers, shown as reference contour 402.

Referring again to FIG. 3, differences are quantified between (a) the contours of the plurality of features of the mask as specified by the semi-physical model and (b) measured contours of the plurality of features on the physical wafer as captured by the SEM images to define target variables corresponding to the quantified differences (block 308). According to such an embodiment, the delta between the initial OPC contour and the SEM contour is the determined model error of the base OPC model.

According to the disclosed embodiments, density and optical parameters are calculated for one or more overlapping reference layers in proximity to the contours of a current layer (block 310).

Referring again to FIG. 3, the target variables and the calculated density parameters of the reference layers are then used to train a machine learning algorithm to characterize the difference between a measured contour and a prediction of the residual errors in a multilayer OPC model (block 312).

Figure 4B:
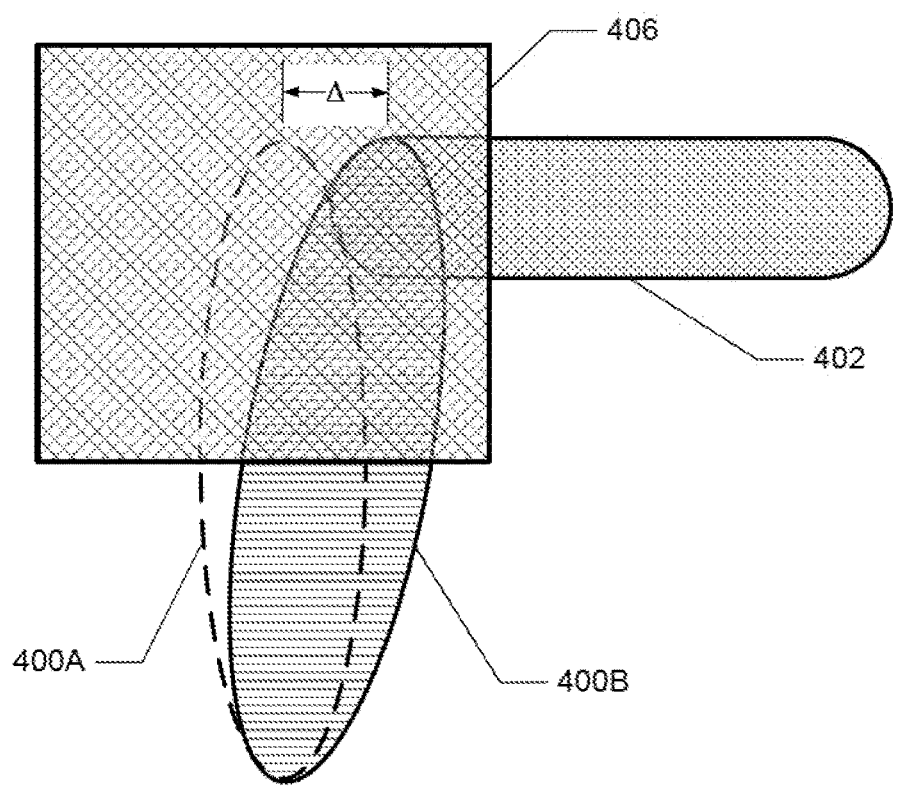

FIG. 4B is a diagram of the hypothetical overlay of contours from the current layer and a reference layer after considering the multilayer interaction as specified by the target variables and the calculated density. The delta represents a difference between the initial OPC contour 400A and a final contour 400B after considering the multilayer interaction. The delta becomes the target variable. The box 406 represents an example region where the density of the mask layers are calculated.

FIG. 4C is an example target variable table used for machine learning model training. The target variable table comprises a plurality of vertex records that correspond to respective vertices of the contours within a sampling data set (totaling n vertices). Each vertex record includes (a) a value of the target variable, which represents an amount of difference between the initial OPC contour and the SEM contour, and (b) an array of density values (e.g., an m×m matrix) for the vertex. Referring to FIGS. 3 and 4C, the target variable table may be input via block 308 to the machine learning training process shown in block 312.

Because the model, the structures, the features, and the mask is so complex it simply is not practical to manually determine what function or adaptations to the incoming base OPC model are necessary to conform that model to the reality as observed in the SEM imagery taken from fabricated silicon wafers utilizing the base OPC model. Use of the neural network 108 to apply machine learning therefore provides a significant advantage as the neural network 108 is leveraged to determine the complexity and learn the necessary adaptations.

In accordance with certain embodiments, the neural network 108 predicts the deterministic model error or process driven changes in critical dimensions for the size and position of features of a current layer after consider multi-layer effects of overlapping reference layers.

In accordance with one embodiment, the multilayer model training makes use of three types of contours: the semi-physical model contour or initial OPC contour, the SEM contour, and the multilayer model created by applying the contour shift prediction 110 of the trained neural network 108 as a correction for the base OPC model, thus yielding an improved contour fit between the improved prediction and reality.

Ideally, the combination of the semi-physical model and the output of the trained neural network would exactly equal the physical data which equates the observed measurements from the SEM imagery data. In practice, significant improvement is attained, but the predicted final contour is not exactly identical, but it is sufficiently accurate for the smaller feature size dimensions and positions utilized by the newer technologies, and thus, appropriate for scaling up silicon wafer production in high volume manufacturing.

Although not exact, the predicted final contour rendered by the final model is much closer to the actually observed SEM data and the contour shift prediction 110 from FIG. 1 is thus usable to better predict a wide array of structures and how they will behave, which may then compared to new SEM image for such features. Moreover, iterative training of the neural network further improves the predictive capability and thus improves the eventual final model and final contour for any mask structures and features.

Figure 5:
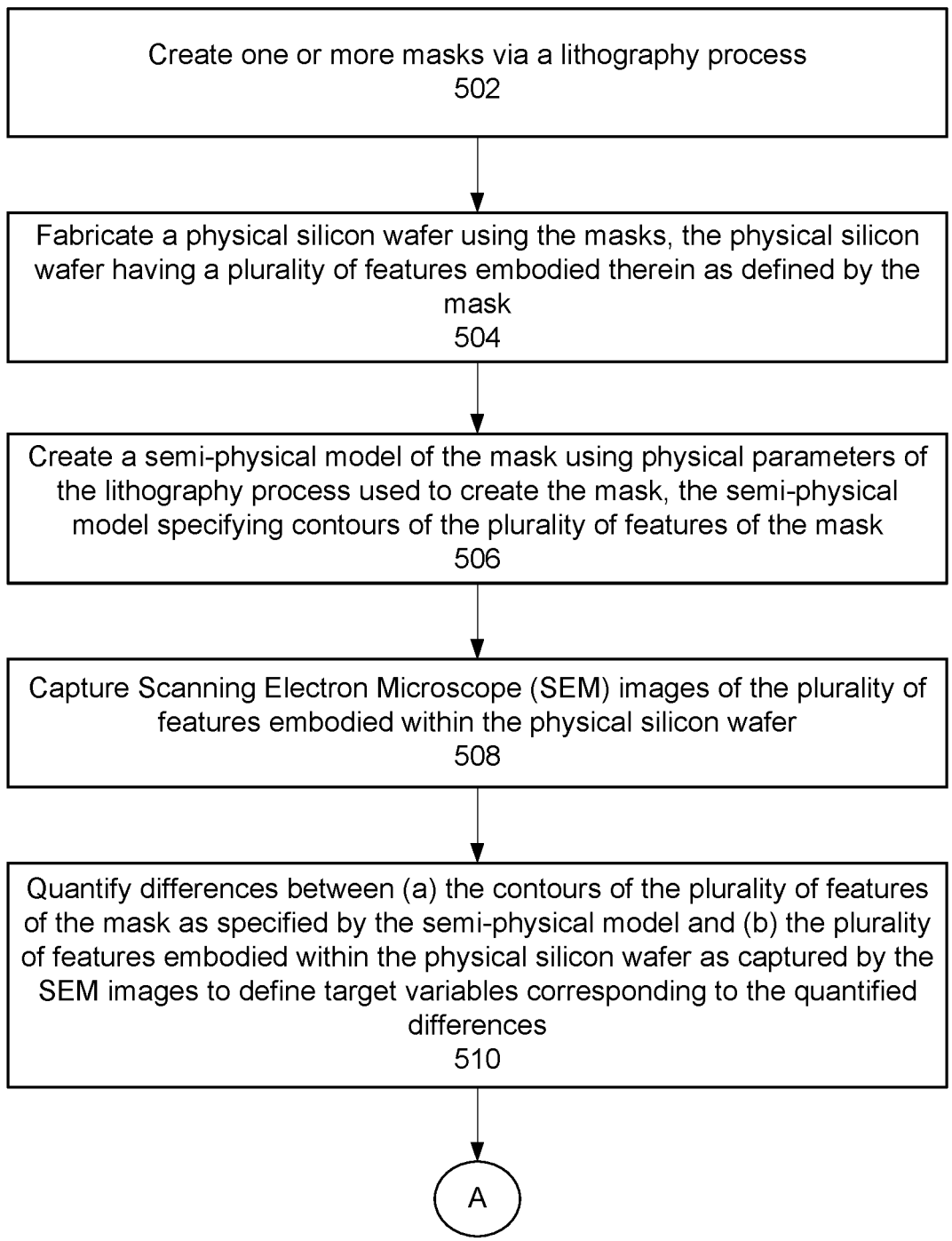
FIG. 5 is a flow diagram illustrating a method for reducing Optical Proximity Correction (OPC) model error via a machine learning algorithm in accordance with described embodiments.
Figure 5:
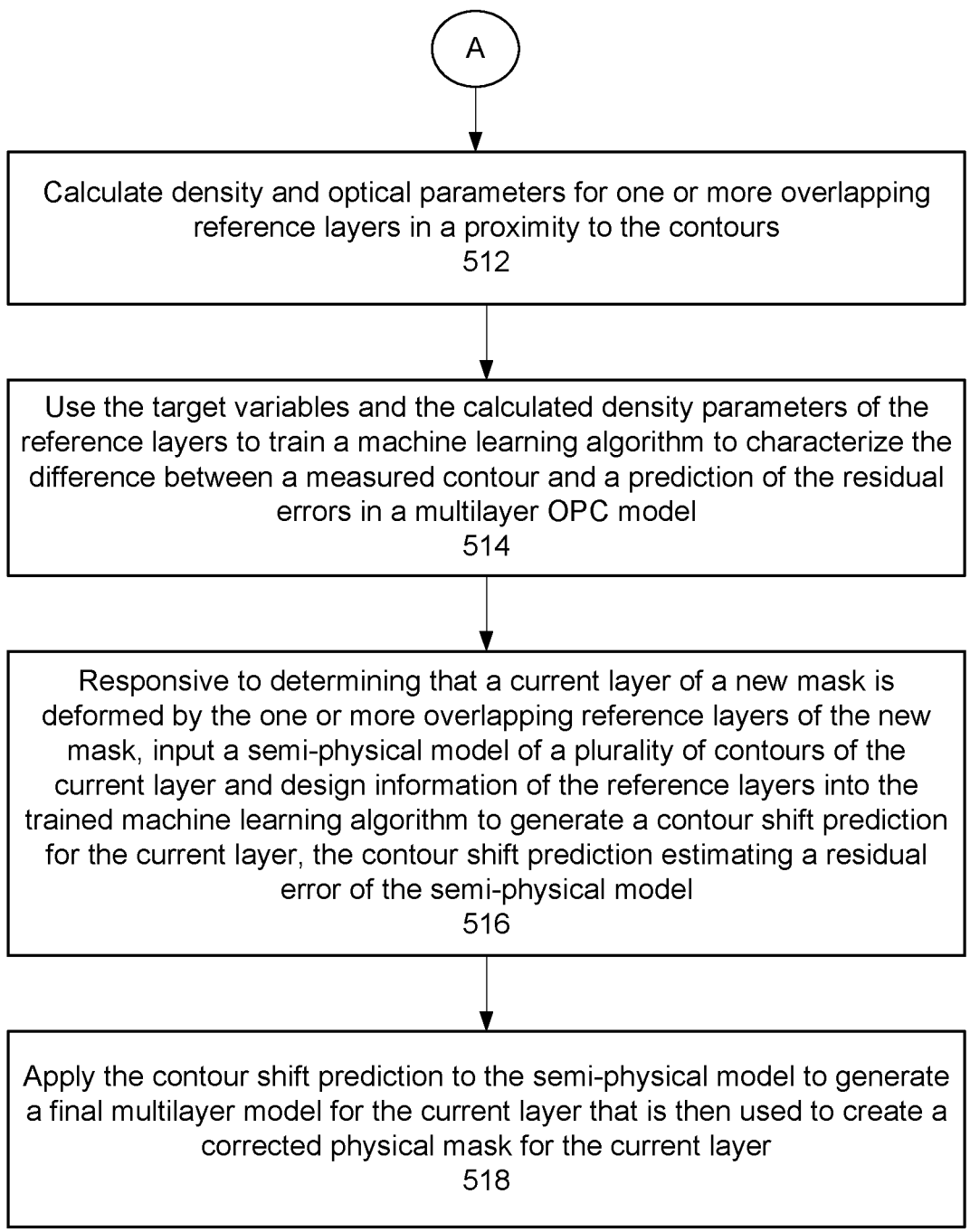

FIG. 5 is a flow diagram illustrating a method 500 for reducing OPC model error via a machine learning algorithm in accordance with described embodiments. Some of the blocks and/or operations listed below are optional in accordance with certain embodiments. The numbering of the blocks presented is for the sake of clarity and is not intended to prescribe an order of operations in which the various blocks must occur. Additionally, operations from method 500 may be utilized in a variety of combinations.

At block 502 the method for reducing Optical Proximity Correction (OPC) model error via a machine learning algorithm begins with creating one or more masks via a lithography process.

At block 504 the method includes fabricating a physical silicon wafer using the masks, the physical silicon wafer having a plurality of features embodied therein as defined by the mask.

At block 506 the method includes creating a semi-physical model of the mask using physical parameters of the lithography process used to create the mask, the semi-physical model specifying contours of the plurality of features of the mask.

At block 508 the method includes capturing Scanning Electron Microscope (SEM) images of the plurality of features embodied within the physical silicon wafer.

At block 510 the method includes quantifying differences between (a) the contours of the plurality of features of the mask as specified by the semi-physical model and (b) the plurality of features embodied within the physical silicon wafer as captured by the SEM images to define target variables corresponding to the quantified differences.

At block 512 the method includes calculating density and optical parameters are for one or more overlapping reference layers in a proximity to the contours.

At block 514 the method includes using the target variables and the calculated density parameters of the reference layers to train a machine learning algorithm to characterize the difference between a measured contour and a prediction of the residual errors in a multilayer OPC model.

At block 516 the method includes responsive to determining that a current layer of a new mask is deformed by the one or more overlapping reference layers of the new mask, inputting a semi-physical model of a plurality of contours of the current layer and design information of the reference layers into the trained machine learning algorithm to generate a contour shift prediction for the current layer, the contour shift prediction estimating a residual error of the semi-physical model.

At block 518 the method includes applying the contour shift prediction to the semi-physical model to generate a final multilayer model for the current layer that is then used to create a corrected physical mask for the current layer.

A further aspect of the disclosed embodiments recognizes that some generic and flexible forms of machine learning models do not take into account several physical constraints that are critical for OPC modeling, such as bandwidth-limited spatial variation and symmetry requirements in model prediction. Lack of these constraints identified to cause variation in the semi-physical models and inconsistent prediction in the case of symmetric patterns.

With respect to the problem of bandwidth-limited spatial variation, the semi-physical models are typically simulated with a square bounding box with an ambit of approximately 200 nanometers. The orientation of the bounding box is rotated to align with a gradient direction of optical intensity. As a consequence, the rotating box (also referred to as a rotated frame) introduces high-frequency variations at locations where the gradient direction changes rapidly, such as sharp line-ends and corners. The rotating frame of the semi-physical models may produce model contours with undesired high-frequency variations that appear as kinks in the model contours. The cause of these contour kinks is that as the orientation of the input image map rotates along sharp corners, the intensity of each pixel within the 2D map varies rapidly. This rapid change and intensity leads to noisy contour shift predictions.

According to one embodiment, contour kink is addressed by creating the semi-physical model using a fixed frame model form in which orientation of the bounding box used to simulate the semi-physical model remains fixed to provide a fixed frame intensity map for the semi-physical model. By using the fixed frame intensity map as a model input, each pixel within the 2D map has a spatial variation that is bandwidth-limited due to the resolution limit of the optical imaging system. The intensity value at each pixel does not change at a frequency higher than $2NA/\lambda$, where $\lambda$ is the light wavelength and NA is the numerical aperture. These bandwidth-limited input features are then used to calibrate the machine learning model, which is in general a non-linear model with high capacity. Nonlinearity in the model form can still enable high frequency variation in the model prediction, but can be effectively controlled by various regularization techniques such as standard L2 regularization or spatial regulation.

Another issue with the rotating frame is that mirror symmetries are not guaranteed, meaning that the predicted EPE correction changes if design patterns are inverted. That is, by flipping a design pattern either along the x or y-axis, the model should predict exactly the same contours, but flipped accordingly. Variation in mirror symmetry impacts critical dimension (CD) control. In some types of layouts, the critical dimension predicted by the rotating frame semi-physical model can differ up to 6 nanometers compared to patterns that are mirror-symmetric.

A standard machine learning models represented as a function f( ) that takes a 2D image as input and returns a prediction value. According to a further embodiment, mirror symmetries is enforced by modifying the mathematical construct f( ) of the semi-physical model. In the present embodiments, the function f( ) for the semi-physical model is modified to receive as input a plurality of 2D images flipped along x and y-axis relative to one another. The plurality of 2D images are then combined in a cumulative way, e.g., such as by averaging, to produce a single output predicted value to enforce mirror symmetry. More specifically, four different 2D images are input to the function f( ) an original 2D image, the 2D image flipped along an x-axis, the 2D image flipped along the y-axis, and the 2D image flipped along both the x and y-axis. The cumulative property of the semi-physical model guarantees that the single output predicted value or EPE stays a same even when flipping the 2D intensity map.

Figure 6:
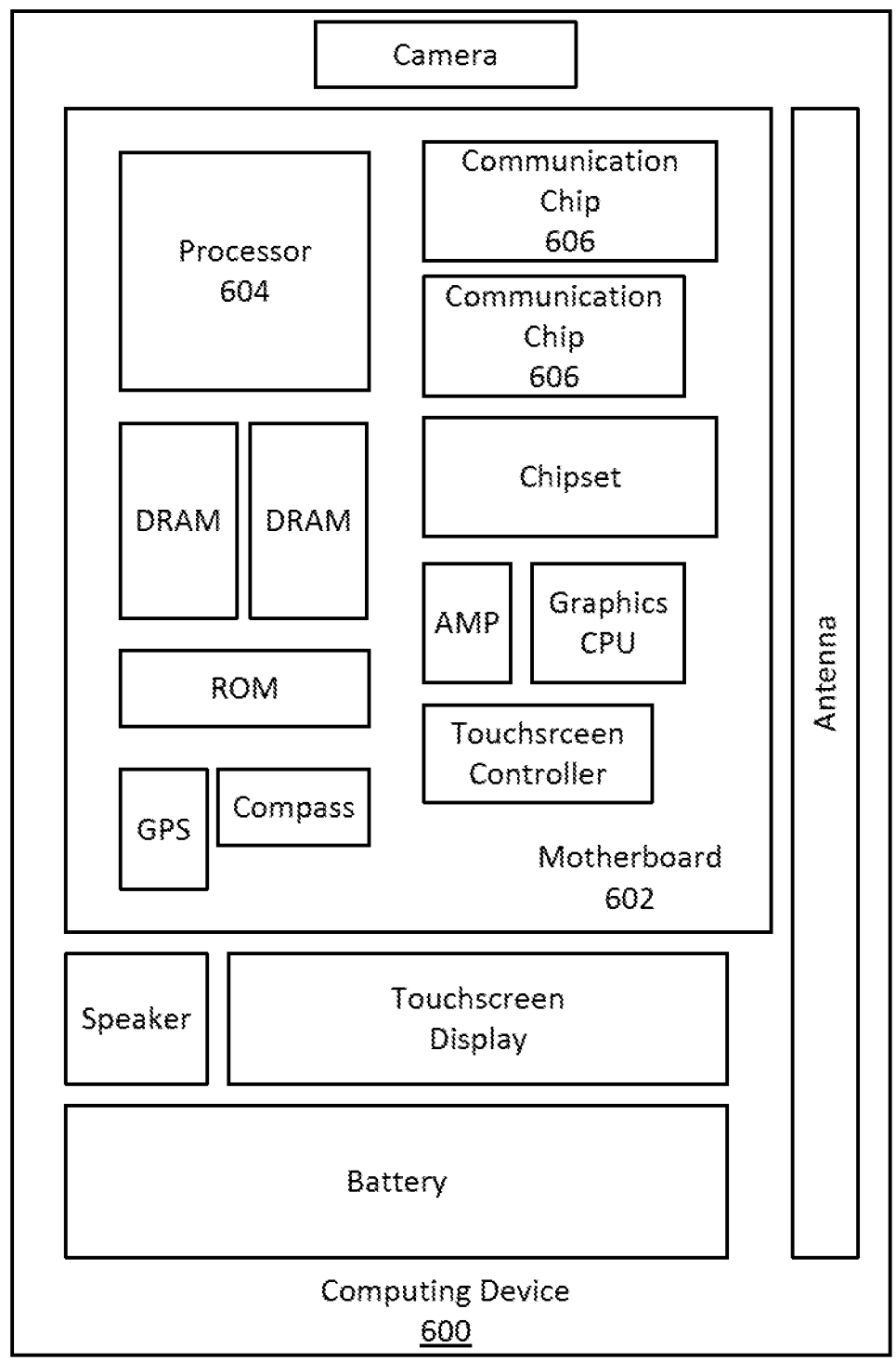
FIG. 6 illustrates a computing device representing an example of a system upon which features of the present invention may be implemented.

FIG. 6 illustrates a computing device 600 representing an example of a system upon which features of the present invention may be implemented. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. The term "processor" may refer to any device or portion of a device that processes electronic data from registers and/or memory to transform that electronic data into other electronic data that may be stored in registers and/or memory.

The communication chip 606 also includes an integrated circuit die packaged within the communication chip 606. In accordance with another implementation of embodiments of the disclosure, the integrated circuit die of the communication chip includes one or more embedded non-volatile memory structures.

In further implementations, another component housed within the computing device 600 may contain an integrated circuit die that includes one or more embedded non-volatile memory structures.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example Embodiment 1

A method for optical proximity correction (OPC) comprises creating a semi-physical model of a mask for a current layer in an IC design layout using physical parameters of a lithography process used to create the mask, the semi-physical model specifying contours of the plurality of features of the mask. It is determined from design information whether the current layer is deformed by the one or more reference layers that overlap the current layer near the contours. Responsive to determining that the current layer is deformed by the one or more reference layers, the semi-physical model and the design information of the one or more reference layers are input into a trained machine learning algorithm to generate a contour shift prediction for the current layer, the contour shift prediction estimating a residual error of the semi-physical model. The contour shift prediction is then used for multilayer OPC correction of the current layer.

Example Embodiment 2

The method of claim 1, wherein determining from the design information further comprises: providing the design information as a map of target polygons of the one or more reference layers.

Example Embodiment 3

The method of claim 1 or 2, wherein determining from the design information further comprises smoothing polygons to reduce an incidence of artifacts associated with sudden transitions between regions in the current layer that are, and are not, overlapped the one or more reference layers.

Example Embodiment 4

The method of claim 1, 2 or 3, wherein using the contour shift prediction for multilayer OPC correction of the current layer further comprises: applying the contour shift prediction to the semi-physical model to generate a final multilayer model; and using the final multilayer model by a correction engine for mask design to apply appropriate correction and generate a corrected new physical mask for the current layer.

Example Embodiment 5

The method of claim 1, 2, 3 or 4, further comprising: implementing the trained machine learning algorithm as an artificial neural network.

Example Embodiment 6

The method of claim 5, further comprising: training the artificial neural network to describe a relationship between an IC design layout and OPC model error using image input parameters and layout information from the one or more of reference layers to enable the artificial neural network to learn about the IC design layout.

Example Embodiment 7

The method of claim 6, wherein training the artificial neural network further comprises: inputting density parameters of the features of neighboring reference layers as the layout information for the one or more the reference layers.

Example Embodiment 8

The method of claim 6, further comprising: using as the image input parameters (a) initial single layer OPC contours that provide a prediction of a physical space via the semi-physical model, and (b) scanning electron microscope (SEM) image data of the plurality of features embodied on the physical wafer.

Example Embodiment 9

The method of claim 1, 2, 3 or 4, further comprising: training the machine learning algorithm by: patterning a physical silicon wafer using the one or more masks, the physical silicon wafer having a plurality of features embodied therein as defined by the mask; capturing Scanning Electron Microscope (SEM) images of the plurality of features embodied on the physical wafer; creating a semi-physical model of the mask using physical parameters of the lithography process used to create the mask, wherein the semi-physical model specifies contours of the plurality of features of the mask; quantifying differences between (a) the contours of the plurality of features of the mask as specified by the semi-physical model and (b) measured contours of the plurality of features on the physical wafer as captured by the SEM images to define target variables corresponding to the quantified differences; calculating density and optical parameters of one or more overlapping reference layers in a proximity to the contours; and using the target variables and the calculated density and optical parameters of the reference layers to train the machine learning algorithm to characterize the difference between a measured contour and a prediction of the residual errors in a multilayer OPC model.

Example Embodiment 10

An apparatus comprising a machine-readable medium having instructions which when executed by a machine cause the machine to perform operations comprising: creating a semi-physical model of a mask for a current layer in an IC design layout using physical parameters of a lithography process used to create the mask, the semi-physical model specifying contours of the plurality of features of the mask; determining from design information whether the current layer is deformed by the one or more reference layers that overlap the current layer near the contours; responsive to determining that the current layer is deformed by the one or more reference layers, inputting the semi-physical model and the design information of the one or more reference layers into a trained machine learning algorithm to generate a contour shift prediction for the current layer, the contour shift prediction estimating a residual error of the semi-physical model; and using the contour shift prediction for multilayer OPC correction of the current layer.

Example Embodiment 11

The apparatus of claim 10, wherein determining from the design information further comprises: providing the design information as a map of target polygons of the one or more reference layers.

Example Embodiment 12

The apparatus of claim 10 or 11, wherein determining from the design information further comprises smoothing polygons to reduce an incidence of artifacts associated with sudden transitions between regions in the current layer that are, and are not, overlapped the one or more reference layers.

Example Embodiment 13

The apparatus of claim 10, 11 or 12, wherein using the contour shift prediction for multilayer OPC correction of the current layer further comprises: applying the contour shift prediction to the semi-physical model to generate a final multilayer model; and using the final multilayer model by a correction engine for mask design to apply appropriate correction and generate a corrected new physical mask for the current layer.

Example Embodiment 14

The apparatus of claim 10, 11, 12 or 13, further comprising: implementing the trained machine learning algorithm as an artificial neural network.

Example Embodiment 15

The apparatus of claim 14, further comprising: training the artificial neural network to describe a relationship between an IC design layout and OPC model error using image input parameters and layout information from the one or more of reference layers to enable the artificial neural network to learn about the IC design layout.

Example Embodiment 16

The apparatus of claim 15, wherein training the artificial neural network further comprises: inputting density parameters of the features of neighboring reference layers as the layout information for the one or more the reference layers.

Example Embodiment 17

The apparatus of claim 15, further comprising: using as the image input parameters (a) initial single layer OPC contours that provide a prediction of a physical space via the semi-physical model, and (b) scanning electron microscope (SEM) image data of the plurality of features embodied on the physical wafer.

Example Embodiment 18

The apparatus of claim 10, 11, 12, 13 or 14 further comprising: training the machine learning algorithm by: patterning a physical silicon wafer using the one or more masks, the physical silicon wafer having a plurality of features embodied therein as defined by the mask; capturing Scanning Electron Microscope (SEM) images of the plurality of features embodied on the physical wafer; creating a semi-physical model of the mask using physical parameters of the lithography process used to create the mask, wherein the semi-physical model specifies contours of the plurality of features of the mask; quantifying differences between (a) the contours of the plurality of features of the mask as specified by the semi-physical model and (b) measured contours of the plurality of features on the physical wafer as captured by the SEM images to define target variables corresponding to the quantified differences; calculating density and optical parameters of one or more overlapping reference layers in a proximity to the contours; and using the target variables and the calculated density and optical parameters of the reference layers to train the machine learning algorithm to characterize the difference between a measured contour and a prediction of the residual errors in a multilayer OPC model.

Example Embodiment 19

A system comprises a mask created via a lithography process. A physical silicon wafer is fabricated using the masks, the physical silicon wafer having a plurality of features embodied therein as defined by the mask. A memory of a computer system stores a semi-physical model of the mask created using physical parameters of the lithography process used to create the mask, the semi-physical model specifying contours of the plurality of features of the mask; and images of the plurality of features embodied within the physical silicon wafer. A multilayer model predictor executing on one or more processors is configured to: quantify differences between (a) the contours of the plurality of features of the mask as specified by the semi-physical model and (b) the plurality of features embodied within the physical silicon wafer as captured by the SEM images to define target variables corresponding to the quantified differences; calculate density and optical parameters are for one or more overlapping reference layers in a proximity to the contours; use the target variables and the calculated density parameters of the reference layers to train a machine learning algorithm to characterize the difference between a measured contour and a prediction of the residual errors in a multilayer OPC model; responsive to determining that a current layer of a new mask is deformed by the one or more overlapping reference layers of the new mask, input a semi-physical model of a plurality of contours of the current layer and design information of the reference layers are into the trained machine learning algorithm to generate a contour shift prediction for the current layer, the contour shift prediction estimating a residual error of the semi-physical model; and apply the contour shift prediction to the semi-physical model to generate a final multilayer model for the current layer that is used to create a corrected physical mask for the current layer.

Example Embodiment 20

The system of claim 19, wherein the machine learning algorithm is implemented as an artificial neural network.

Example Embodiment 21

The system of claim 19 or 20, further comprising a scanning electron microscope (SEM) to capture the images.

Embodiment 22

The system of claim 19, 20 or 21, wherein the semi-physical model of the mask is created using a fixed frame model form in which an orientation of a bounding box used to simulate the semi-physical model remains fixed to provide a fixed frame intensity map for the semi-physical model.

Embodiment 23

The system of claim 22, wherein using the fixed frame intensity map causes each pixel within a 2D map to have a spatial variation that is bandwidth-limited, such that an intensity value at each pixel does not change at a frequency higher than 2NA/λ, where λ is a light wavelength and NA is a numerical aperture.

Embodiment 24

The system of claim 19, 21, 22 or 23, wherein the semi-physical model is represented as a function f( ) that receives as input a plurality of 2D images flipped along x and y-axis relative to one another, wherein the plurality of 2D images are cumulatively combined to produce a single output predicted value to enforce mirror symmetry.

Embodiment 25

The system of claim 24, wherein the plurality of 2D images comprise an original 2D image, the 2D image flipped along an x-axis, the 2D image flipped along the y-axis, and the 2D image flipped along both the x and y-axis.

What is claimed is:

1. A method for optical proximity correction (OPC) comprising:
creating a semi-physical model of a mask for a current layer in an IC design layout using physical parameters of a lithography process used to create the mask, the semi-physical model specifying contours of the plurality of features of the mask;
determining from design information whether the current layer is deformed by the one or more reference layers that overlap the current layer near the contours;
responsive to determining that the current layer is deformed by the one or more reference layers, inputting the semi-physical model and the design information of the one or more reference layers into a trained machine learning algorithm to generate a contour shift prediction for the current layer, the contour shift prediction estimating a residual error of the semi-physical model; and
using the contour shift prediction for multilayer OPC correction of the current layer.

2. The method of claim 1, wherein determining from the design information further comprises: providing the design information as a map of target polygons of the one or more reference layers.

3. The method of claim 2, wherein determining from the design information further comprises smoothing polygons to reduce an incidence of artifacts associated with sudden transitions between regions in the current layer that are, and are not, overlapped the one or more reference layers.

4. The method of claim 1, wherein using the contour shift prediction for multilayer OPC correction of the current layer further comprises:
applying the contour shift prediction to the semi-physical model to generate a final multilayer model; and
using the final multilayer model by a correction engine for mask design to apply appropriate correction and generate a corrected new physical mask for the current layer.

5. The method of claim 1, further comprising: implementing the trained machine learning algorithm as an artificial neural network.

6. The method of claim 5, further comprising: training the artificial neural network to describe a relationship between an IC design layout and OPC model error using image input parameters and layout information from the one or more of reference layers to enable the artificial neural network to learn about the IC design layout.

7. The method of claim 6, wherein training the artificial neural network further comprises: inputting density parameters of the features of neighboring reference layers as the layout information for the one or more the reference layers.

8. The method of claim 6, further comprising: using as the image input parameters (a) initial single layer OPC contours that provide a prediction of a physical space via the semi-physical model, and (b) scanning electron microscope (SEM) image data of the plurality of features embodied on the physical wafer.

9. The method of claim 1, further comprising: training the machine learning algorithm by:
patterning a physical silicon wafer using the one or more masks, the physical silicon wafer having a plurality of features embodied therein as defined by the mask;
capturing Scanning Electron Microscope (SEM) images of the plurality of features embodied on the physical wafer; creating a semi-physical model of the mask using physical parameters of the lithography process used to create the mask, wherein the semi-physical model specifies contours of the plurality of features of the mask;
quantifying differences between (a) the contours of the plurality of features of the mask as specified by the semi-physical model and (b) measured contours of the plurality of features on the physical wafer as captured by the SEM images to define target variables corresponding to the quantified differences;

calculating density and optical parameters of one or more overlapping reference layers in a proximity to the contours; and using the target variables and the calculated density and optical parameters of the reference layers to train the machine learning algorithm to characterize the difference between a measured contour and a prediction of the residual errors in a multilayer OPC model.

10. An apparatus comprising a machine-readable medium having instructions which when executed by a machine cause the machine to perform operations comprising:

creating a semi-physical model of a mask for a current layer in an IC design layout using physical parameters of a lithography process used to create the mask, the semi-physical model specifying contours of the plurality of features of the mask;

determining from design information whether the current layer is deformed by the one or more reference layers that overlap the current layer near the contours;

responsive to determining that the current layer is deformed by the one or more reference layers, inputting the semi-physical model and the design information of the one or more reference layers into a trained machine learning algorithm to generate a contour shift prediction for the current layer, the contour shift prediction estimating a residual error of the semi-physical model; and using the contour shift prediction for multilayer OPC correction of the current layer.

11. The apparatus of claim 10, wherein determining from the design information further comprises: providing the design information as a map of target polygons of the one or more reference layers.

12. The apparatus of claim 11, wherein determining from the design information further comprises smoothing polygons to reduce an incidence of artifacts associated with sudden transitions between regions in the current layer that are, and are not, overlapped the one or more reference layers.

13. The apparatus of claim 11, wherein using the contour shift prediction for multilayer OPC correction of the current layer further comprises:

applying the contour shift prediction to the semi-physical model to generate a final multilayer model; and using the final multilayer model by a correction engine for mask design to apply appropriate correction and generate a corrected new physical mask for the current layer.

14. The apparatus of claim 10, further comprising: implementing the trained machine learning algorithm as an artificial neural network.

15. The apparatus of claim 14, further comprising: training the artificial neural network to describe a relationship between an IC design layout and OPC model error using image input parameters and layout information from the one or more of reference layers to enable the artificial neural network to learn about the IC design layout.

16. The apparatus of claim 15, wherein training the artificial neural network further comprises: inputting density parameters of the features of neighboring reference layers as the layout information for the one or more the reference layers.

17. The apparatus of claim 15, further comprising: using as the image input parameters (a) initial single layer OPC contours that provide a prediction of a physical space via the semi-physical model, and (b) scanning electron microscope (SEM) image data of the plurality of features embodied on the physical wafer.

18. The apparatus of claim 10, further comprising: training the machine learning algorithm by:

patterning a physical silicon wafer using the one or more masks, the physical silicon wafer having a plurality of features embodied therein as defined by the mask;

capturing Scanning Electron Microscope (SEM) images of the plurality of features embodied on the physical wafer; creating a semi-physical model of the mask using physical parameters of the lithography process used to create the mask, wherein the semi-physical model specifies contours of the plurality of features of the mask;

quantifying differences between (a) the contours of the plurality of features of the mask as specified by the semi-physical model and (b) measured contours of the plurality of features on the physical wafer as captured by the SEM images to define target variables corresponding to the quantified differences;

calculating density and optical parameters of one or more overlapping reference layers in a proximity to the contours; and using the target variables and the calculated density and optical parameters of the reference layers to train the machine learning algorithm to characterize the difference between a measured contour and a prediction of the residual errors in a multilayer OPC model.

19. A system comprising:

a mask created via a lithography process;

a physical silicon wafer fabricated using the masks, the physical silicon wafer having a plurality of features embodied therein as defined by the mask;

a memory of a computer system, the memory to store:

a semi-physical model of the mask created using physical parameters of the lithography process used to create the mask, the semi-physical model specifying contours of the plurality of features of the mask; and images of the plurality of features embodied within the physical silicon wafer;

a multilayer model predictor executing on one or more processors configured to:

quantify differences between (a) the contours of the plurality of features of the mask as specified by the semi-physical model and (b) the plurality of features embodied within the physical silicon wafer as captured by the SEM images to define target variables corresponding to the quantified differences;

calculate density and optical parameters are for one or more overlapping reference layers in a proximity to the contours;

use the target variables and the calculated density parameters of the reference layers to train a machine learning algorithm to characterize the difference between a measured contour and a prediction of the residual errors in a multilayer OPC model;

responsive to determining that a current layer of a new mask is deformed by the one or more overlapping reference layers of the new mask, input a semi-physical model of a plurality of contours of the current layer and design information of the reference layers into the trained machine learning algorithm to generate a contour shift prediction for the current layer, the contour shift prediction estimating a residual error of the semi-physical model; and apply the contour shift prediction to the semi-physical model to generate a final multilayer model for the current layer that is used to create a corrected physical mask for the current layer.

20. The system of claim 19, wherein the machine learning algorithm is implemented as an artificial neural network.

21. The system of claim 19, further comprising a scanning electron microscope (SEM) to capture the images.

22. The system of claim 19, wherein the semi-physical model of the mask is created using a fixed frame model form in which an orientation of a bounding box used to simulate the semi-physical model remains fixed to provide a fixed frame intensity map for the semi-physical model.

23. The system of claim 22, wherein using the fixed frame intensity map causes each pixel within a 2D map to have a spatial variation that is bandwidth-limited, such that an intensity value at each pixel does not change at a frequency higher than $2NA/\lambda$, where $\lambda$ is a light wavelength and NA is a numerical aperture.

24. The system of claim 19, wherein the semi-physical model is represented as a function $f(\ )$ that receives as input a plurality of 2D images flipped along x and y-axis relative to one another, wherein the plurality of 2D images are cumulatively combined to produce a single output predicted value to enforce mirror symmetry.

25. The system of claim 24, wherein the plurality of 2D images comprise an original 2D image, the 2D image flipped along an x-axis, the 2D image flipped along the y-axis, and the 2D image flipped along both the x and y-axis.

* * * * *